Sept. 4, 1962 R. L. VELASQUEZ 3,052,075
STORE SYSTEMS
Filed Feb. 16, 1960 2 Sheets-Sheet 1

INVENTOR
R.L. VELASQUEZ

Sept. 4, 1962　　　　R. L. VELASQUEZ　　　3,052,075
STORE SYSTEMS

Filed Feb. 16, 1960　　　　　　　　2 Sheets-Sheet 2

INVENTOR
R.L. VELASQUEZ

United States Patent Office 3,052,075
Patented Sept. 4, 1962

3,052,075
STORE SYSTEMS
Robert L. Velasquez, 12555 Goulburn, Detroit 5, Mich.
Filed Feb. 16, 1960, Ser. No. 9,138
5 Claims. (Cl. 53—259)

This invention relates to a new and useful invention for bagging-packaging items and merchandise in store systems, mainly super-market check-out counters. At present the supermarket cashier must check your items for price so as to to register the correct amount, pick them up and place them on a second conveyor belt for bagging. When the sale is completed the cashier must leave the register to bag the items by hand, therefore the person must wait for the bagging, delaying the oncoming customers, placing an extra burden on the cashier. With my invention a cashier picks up the items one time only, registers them, and places them in the Kwik-Pak drawer with the one operation. When the drawer is full to capacity the cashier presses the foot control and the items enter the bag, onto the conveyor for customer pick-up. This operation is automatic, but for loading or placing the empty bag in the Kwik-Pak. The bagging or packaging of items by hand consumes more time than checking and registering; therefore my invention should reduce the man hours as well as waiting time to fifty percent of the present.

Figure 1:
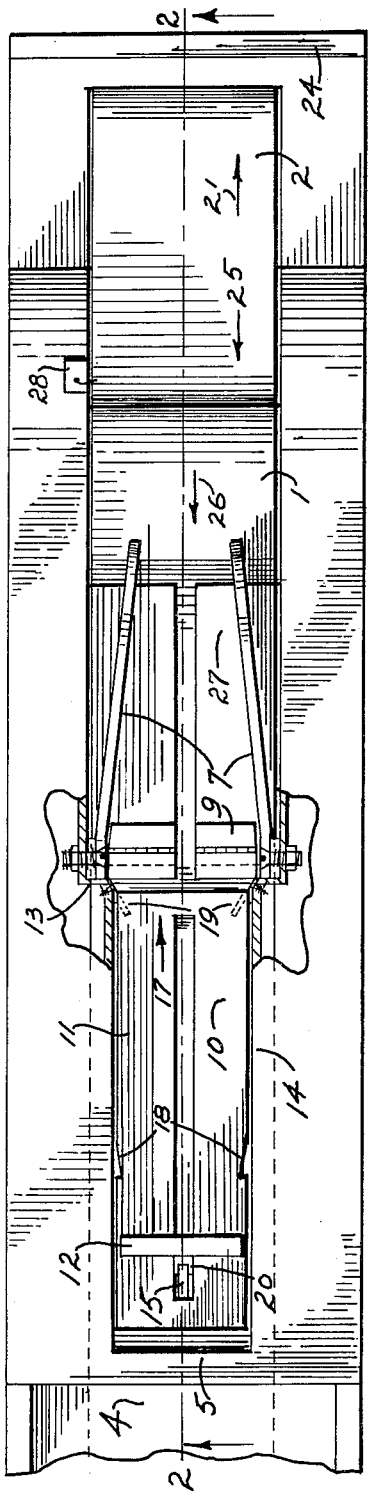
FIG. 1 is a plan view showing my new bagging packaging conveyor fixture with some dimensions exaggerated so as to show details.

In the drawings, my invention is built into a fixture with two conveyor belts 1—2, and one driving off the other 3. Foods or items purchased are brought to the cashier by a conventional conveyor to point 4 with the back of the invention as a stop 5. The cashier first slides a paper bag 6 over the plastic wings 7 and the bottom section of the mouth or opening of the bag 8 under the spring flap 9. As the cashier picks the items for pricing he or she then places them onto the shuttle slide 10 in the trough like assembly 11 loading it from the driver 12 to the end of plastic wings 13 keeping the merchandise below the load line 14. The shuttle slide 10 is floating and is not fastened to the conveyor belt 1 or the driver 12. The weight of items or merchandise hold the shuttle slide 10 to the conveyor 1. The driver arm 15 is the only moving part that is fastened or connected to the conveyor 1 at point 16, which is load position. The shuttle slide 10 and driver assembly 12—15 move forward 17, the shuttle slide enters the mouth of the bag 8 between the plastic blades 7 forcing the spring flap 9 down onto the paper 6 acting as a skid for the oncoming shuttle slide 10 and protecting the bag 6. The shuttle slide 10 has a notch on either side 18 so as to allow spring locks located at 19 to stop and lock the shuttle slide 10 when the notches 18 reach that point 19.

Figure 2:
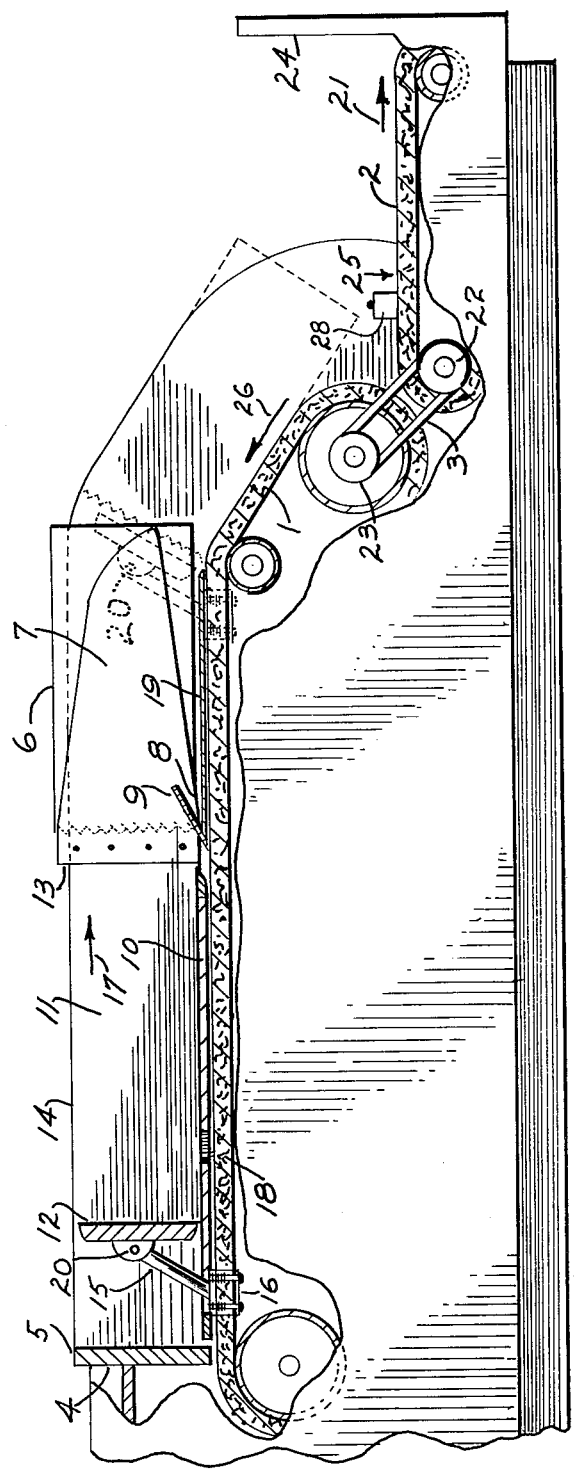
FIG. 2 is a partial section view taken through line 2—2 in FIG. 1, with the thickness of materials and metals exaggerated to show details.

The items have now entered the bag 6 and have spread the plastic blades 7. With this done the driver assembly 12—15 continues on 17 forcing the filled bag 6 off of the blades 7 and the stationary platform 27. The driver 12 pivots at 20 so as to keep the contents in the bag from spilling while descending onto the conveyor belt 2. When the descending bag reaches the second conveyor a limit switch 28 is engaged by the bag and stops both conveyors 1—2 reversing conveyor 1 back to load position as shown in FIGS. 1 and 2. The lower conveyor 2 moves in one direction only 21. The pulley that drives the lower 22 off of the pulley 23 is equipped with a clutch allowing it to go forward 21 and remain stopped when the main conveyor 1 reverses, 26. When the main conveyor 1 is energized the second time the second conveyor 2 will carry the preceding bag of merchandise towards the stop wall 24 clearing the area 25 for the oncoming bag and so on.

I claim:
1. In a bag loading device, the combination of, a counter; a trough formed in said counter; said trough having vertical side walls and being open at the rear end thereof; a horizontal reversible conveyor belt mounted in said trough and forming a moving bottom wall for said trough; a driver member mounted on said reversible conveyor belt and being normally disposed at the front end of said trough at the start of a bag loading operation; the front portion of said trough forming an article loading position; an article shuttleslide carried on said reversible conveyor belt and being movable relative thereto and being normally disposed in said article loading position at the start of a bag loading operation for loading thereon of articles to be loaded in a bag; the rear portion of said trough forming a bag loading position; a platform fixedly mounted over said reversible conveyor belt at said bag loading position; means for holding a bag on said platform in an open position for receiving the articles loaded on said shuttleslide; a second conveyor mounted in said counter below the rear end of said first named conveyor to convey a loaded bag to a pickup position; means for actuating said conveyors to move the driver member rearwardly of said trough to push the shuttleslide and the articles thereon into said bag; means on said counter for holding the shuttleslide after it has entered the bag being loaded to permit the driver to continue moving rearwardly of said trough to push the loaded bag of articles off of the first named conveyor onto the second conveyor; and, means for reversing the movement of said first named conveyor to move the driver member and shuttleslide back to the article loading position and to stop the conveyor belts.

2. In a bag loading device, the combination of, a counter; a trough formed in said counter; said trough having vertical side walls and being open at the rear end thereof; a horizontal reversible conveyor belt mounted in said trough and forming a moving bottom wall for said trough; a driver member mounted on said reversible conveyor belt and being normally disposed at the front end of said trough at the start of a bag loading operation; the front portion of said trough forming an article loading position; an article shuttle slide carried on said reversible conveyor belt and being movable relative thereto and being normally disposed in said article loading position at the start of a bag loading operation for loading thereon of articles to be loaded in a bag; the rear portion of said trough forming a bag loading position; a platform fixedly mounted over said reversible conveyor belt at said bag loading position; means for holding a bag on said platform in an open position for receiving the articles loaded on said shuttleslide; a second conveyor mounted in said counter below the rear end of said first named conveyor to convey a loaded bag to a pickup position; means for actuating said conveyors to move the driver member rearwardly of said trough to push the shuttleslide and the articles thereon into said bag; means on said counter for holding the shuttleslide after it has entered the bag being loaded to permit the driver to continue moving rearwardly of said trough to push the loaded bag of articles off of the first named conveyor onto the second conveyor; means for reversing the movement of said first named conveyor to move the driver member and shuttleslide back to the article loading position and to stop the conveyor belts; said driver member including a vertical flat portion carried by an arm mounted centrally on said first named belt; said shuttleslide having a centrally disposed longitudinal slot through which said driver arm is disposed; and, said platform being divided into two portions by a central longitudinal slot to permit passage therethrough of said driver arm.

3. The bag loading device set forth in claim 2, wherein: said means for holding a bag on said platform in an open position includes a pair of spaced apart blades which are fixedly mounted on said counter over the bag loading position of said trough.

4. The bag loading device set forth in claim 2, wherein: said means on said counter for holding the shuttleslide after it has entered the bag being loaded includes a pair of spring members, located on said counter at the front end of said bag loading position, and being operative to releasably engage the shuttleslide to prevent further movement to the rear of said trough.

5. The bag loading device as set forth in claim 2, wherein: said device includes a means mounted on the front end of said platform for guiding the shuttleslide into the bag being loaded during a bag loading operation.

References Cited in the file of this patent

UNITED STATES PATENTS

| | | |
|---|---|---|
| 1,992,166 | Beauclerk | Feb. 26, 1935 |
| 2,639,071 | Hall | May 19, 1953 |
| 2,937,485 | Wall | May 24, 1960 |